US010082251B1

(12) United States Patent
Deng

(10) Patent No.: US 10,082,251 B1
(45) Date of Patent: Sep. 25, 2018

(54) LIGHT EMITTING DIODE DRIVER CIRCUIT COMPATIBLE WITH BALLAST

(71) Applicant: DONGGUAN PAN AMERICAN ELECTRONICS CO., LTD., DongGuan (CN)

(72) Inventor: Jinsheng Deng, DongGuan (CN)

(73) Assignee: DONGGUAN PAN AMERICAN ELECTRONICS CO., LTD., DongGuan (CN)

( * ) Notice: Subject to any disclaimer, the term of this patent is extended or adjusted under 35 U.S.C. 154(b) by 0 days.

(21) Appl. No.: 15/685,823

(22) Filed: Aug. 24, 2017

(30) Foreign Application Priority Data

Mar. 9, 2017 (CN) ...................... 2017 2 0231468 U

(51) Int. Cl.
| | | |
|---|---|---|
| H05B 33/08 | (2006.01) |
| F21K 9/27 | (2016.01) |
| F21V 23/00 | (2015.01) |
| F21K 9/278 | (2016.01) |
| H05B 37/02 | (2006.01) |

(52) U.S. Cl.
CPC ............ F21K 9/278 (2016.08); F21V 23/003 (2013.01); H05B 33/0809 (2013.01); H05B 33/0887 (2013.01); H05B 37/02 (2013.01)

(58) Field of Classification Search
CPC . F21K 9/27; F21K 9/278; F21V 23/00; F21V 23/003; H05B 37/02; H05B 33/08; H05B 33/0809; H05B 33/0887
See application file for complete search history.

(56) References Cited

U.S. PATENT DOCUMENTS

| | | | | |
|---|---|---|---|---|
| 2007/0069663 A1* | 3/2007 | Burdalski | .......... | H05B 33/0803 315/312 |
| 2012/0217884 A1* | 8/2012 | Raykhman | ......... | H05B 33/0809 315/188 |
| 2013/0293151 A1* | 11/2013 | Puvanakijjakorn | .......................... | H05B 33/0815 315/297 |
| 2016/0102813 A1* | 4/2016 | Ye | .......... | F21V 23/009 315/205 |

* cited by examiner

*Primary Examiner* — Thai Pham
(74) *Attorney, Agent, or Firm* — Platinum Intellectual Property LLP

(57) ABSTRACT

An LED driver circuit compatible with a ballast includes an input circuit, a rectifier and filter circuit, a DC/DC converter circuit, an output circuit, and an LED load circuit, which are sequentially coupled. The input circuit includes buffer capacitors CX1, CX2, and CX3; bleeder resistor strings RX1, RX2, and RX3; and insurance resistors F1, F2, and F3. The input circuit includes a plurality of input terminals and a plurality of output terminals. Each of the output terminals of the input circuit is coupled to other output terminals through the bleeder resistor strings RX1, RX2, and RX3, respectively. The LED driver circuit further includes an IC start-up circuit coupled to the rectifier and filter circuit, and a PWM controller circuit coupled to the DC/DC converter circuit.

10 Claims, 2 Drawing Sheets

LIGHT EMITTING DIODE DRIVER CIRCUIT COMPATIBLE WITH BALLAST

CROSS-REFERENCE TO RELATED APPLICATION

This application claims benefit under 35 U.S.C. § 119 of Chinese Patent Application No. 2017202314680 filed on Mar. 9, 2017, which is hereby incorporated herein by reference in its entirety.

FIELD OF THE INVENTION

The present disclosure relates to driver circuits, and particularly relates to a light emitting diode (LED) driver circuit compatible with a ballast.

BACKGROUND OF THE INVENTION

Due to the need of starting a lamp, some conventional lamp holders are provided with ballasts, and an output terminal of the lamp holder is coupled to the line wire of mains electricity by the ballast. With the development of lighting technologies, some lamps are set up with electronic circuits inside, therefore they can be directly coupled to the mains electricity. However, lamps with electronic driver circuits generally cannot withstand high input voltage. With the ballasts set inside the conventional lamp holders, if the lamp with electronic driver circuit is directly installed on the conventional lamp holder, when turned on, the lamp with electronic driver circuit might be subjected to excessive voltage due to the effect of the ballast, and the electronic driver circuit inside the lamp might be damaged. Due to the lack of electrical knowledge and operation ability, ordinary users are not qualified for modifying the conventional lamp holders to make them compatible with ballasts.

SUMMARY OF THE INVENTION

Accordingly, it is necessary to provide an LED driver circuit compatible with a ballast, which provides power conversion and can be directly coupled to the mains electricity.

An LED driver circuit compatible with a ballast includes an input circuit, a rectifier and filter circuit, a direct current/direct current (DC/DC) converter circuit, an output circuit, and an LED load circuit, which are sequentially coupled; the input circuit includes buffer capacitors CX1, CX2, and CX3; bleeder resistor strings RX1, RX2, and RX3; and insurance resistors F1, F2, and F3; the input circuit includes a plurality of input terminals and a plurality of output terminals; each of the output terminals of the input circuit is coupled to other output terminals through the bleeder resistor strings RX1, RX2, and RX3, respectively; both terminals of each of the buffer capacitors CX1, CX2, and CX3 are coupled to the different output terminals of the input circuit, respectively; the LED driver circuit compatible with the ballast further includes an integrated circuit (IC) start-up circuit coupled to the rectifier and filter circuit, and a pulse width modulation (PWM) controller circuit coupled to the DC/DC converter circuit.

The above and other features of the disclosure including various novel details of construction and combinations of parts, and other advantages, will now be more particularly described in the following specification with reference to the accompanying drawings.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Term "and/or" includes any and all combinations of one or more of the associated listed items.

Figure 1:
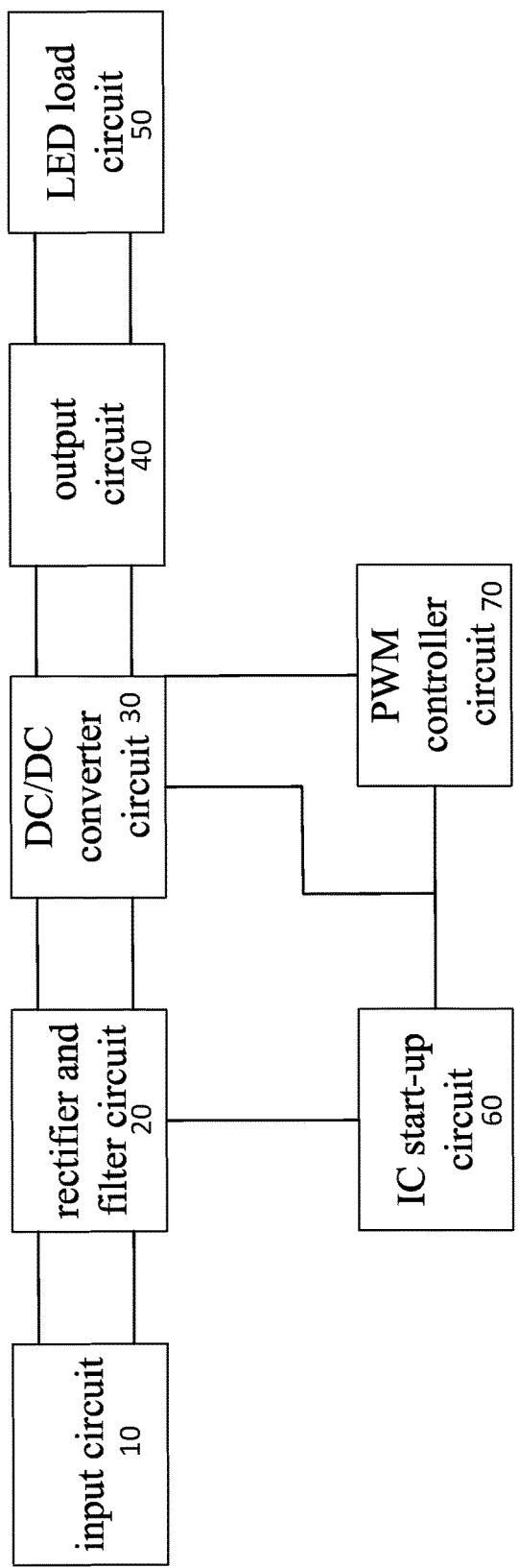
FIG. 1 is a block diagram of an LED driver circuit compatible with a ballast according to an embodiment.
Figure 2:
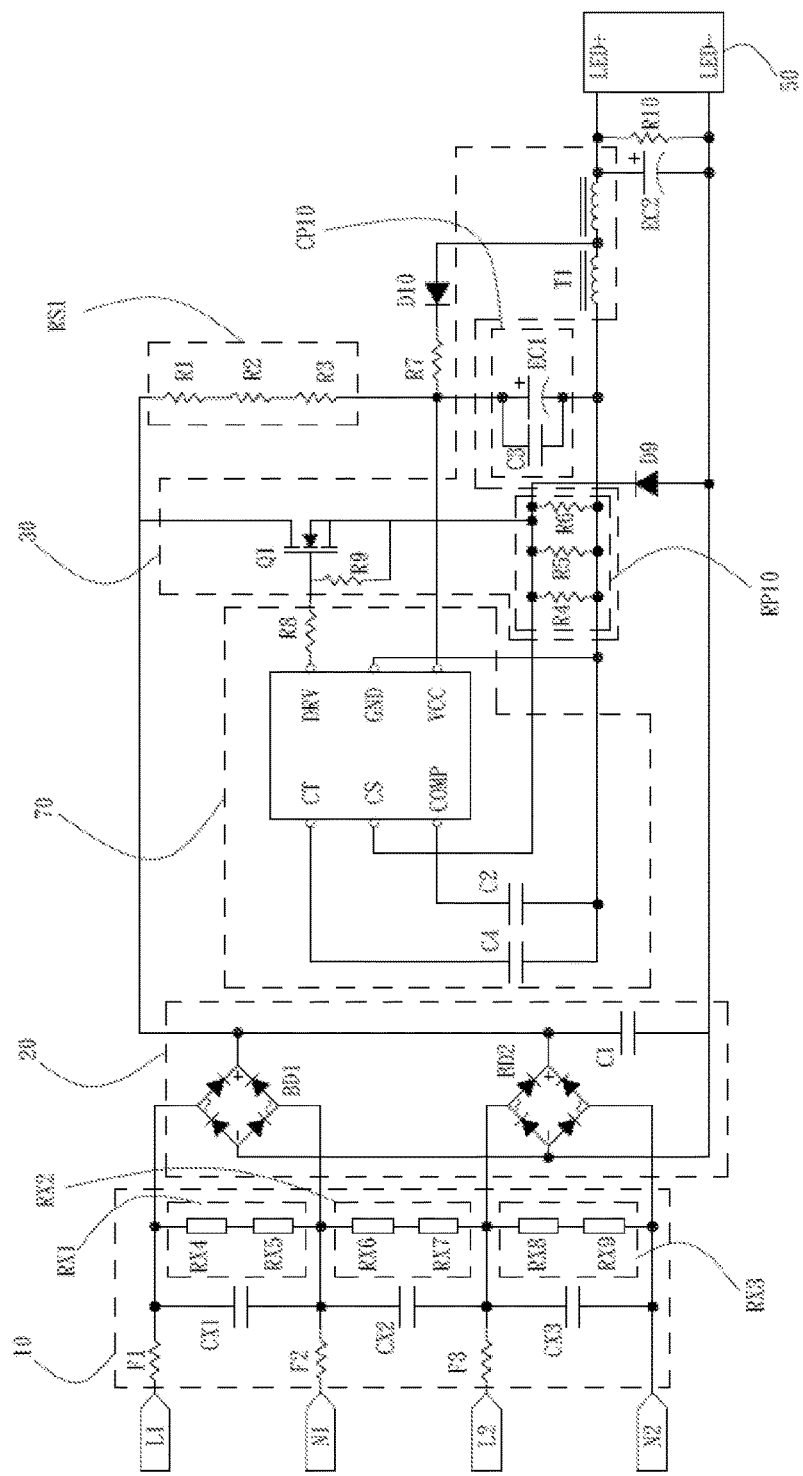
FIG. 2 is a specific circuit diagram of the LED driver circuit shown in FIG. 1.

Referring to FIG. 1 and FIG. 2, according to an embodiment, an LED driver circuit compatible with a ballast is configured to generate light in a lamp. The lamp is coupled to an output terminal of a lamp holder, which may be provided with a ballast inside. The ballast inside the lamp holder can be an instant start ballast, a rapid start ballast, a programmed start ballast, or a magnetic ballast. There are a plurality of manners of connections between the lamp and the output terminal of the lamp holder. The lamp is coupled to the output terminal of the lamp holder through metal pins, and the input terminal of the LED driver circuit compatible with the ballast is coupled to the metal pins of the lamp. The LED driver circuit compatible with the ballast includes an input circuit 10, a rectifier and filter circuit 20, a direct current/direct current (DC/DC) converter circuit 30, an output circuit 40, and an LED load circuit 50, which are sequentially coupled, and the LED driver circuit further includes an integrated circuit (IC) start-up circuit 60 coupled to the rectifier and filter circuit 20, and a pulse width modulation (PWM) controller circuit 70 coupled to the DC/DC converter circuit 30. The metal pins of the lamp are connected to the output terminal of the lamp holder. The input circuit 10, which can buffer an external input overvoltage, is connected to the metal pins of the lamp. The rectifier and filter circuit 20 is used for preliminary rectification. The DC/DC converter circuit 30, output circuit 40, and the PWM controller circuit 70 are used for providing a stable DC power supply for the LED load circuit 50. The LED load circuit 50 is used for generating light.

The input circuit 10 includes buffer capacitors CX1, CX2, and CX3; bleeder resistor strings RX1, RX2, and RX3; and insurance resistors F1, F2, and F3. The input terminals of the input circuit 10 are coupled to the metal pins of the lamp, respectively. There are a plurality of manners of power supply connections between the metal pins of the lamp and the output terminal of the lamp holder. In the present embodiment, the input terminals of the input circuit 10 include a first electrical energy connection terminal, a second electrical energy connection terminal, a third electrical energy connection terminal, and a fourth electrical energy connection terminal. The input circuit 10 further includes a plurality of output terminals.

Each of the output terminals of the input circuit 10 is coupled to other output terminals through the bleeder resistor strings RX1, RX2, and RX3, respectively. Both terminals of each of the buffer capacitors CX1, CX2, and CX3 are coupled to different output terminals of the input circuit 10, respectively. In the present embodiment, the output terminals of the input circuit 10 include a first rectifier connection terminal, a second rectifier connection terminal, a third rectifier connection terminal, and a fourth rectifier connection terminal. The first electrical energy connection terminal, the second electrical energy connection terminal, the third electrical energy connection terminal, and the fourth electrical energy connection terminal can be directly coupled to the first rectifier connection terminal, the second rectifier connection terminal, the third rectifier connection terminal, and the fourth rectifier connection terminal, respectively; meanwhile, in order to obtain a short circuit protection and limit a starting current, the first electrical energy connection terminal, the second electrical energy connection terminal, the third electrical energy connection terminal, and the fourth electrical energy connection terminal can, partly or all through insurance resistors, be coupled to the first rectifier connection terminal, the second rectifier connection terminal, the third rectifier connection terminal, and the fourth rectifier connection terminal, respectively. In the present embodiment, the first electrical energy connection terminal, the second electrical energy connection terminal, and the third electrical energy connection terminal are coupled to the first rectifier connection terminal, the second rectifier connection terminal, and the third rectifier connection terminal through the insurance resistors F1, F2, and F3 respectively; the fourth electrical energy connection terminal is directly coupled to the fourth rectifier connection terminal. In the present embodiment, the bleeder resistor string RX1 includes bleeder resistors RX4, RX5 coupled in series; the bleeder resistor string RX2 includes bleeder resistors RX6, RX7 coupled in series; the bleeder resistor string RX3 includes bleeder resistors RX8, RX9 coupled in series.

The rectifier and filter circuit 20 includes bridge rectifiers BD1, BD2, and a capacitor C1. The rectifier and filter circuit 20 includes a first input connection terminal, a second input connection terminal, a third input connection terminal, and a fourth input connection terminal, and further includes a positive output terminal and a negative output terminal. Two input terminals of the bridge rectifier BD1 serve as the first input connection terminal and the second input connection terminal of the rectifier and filter circuit 20, respectively; the two input terminal of the bridge rectifier BD1 are coupled to the first rectifier connection terminal and the second rectifier connection terminal, respectively. Two input terminals of the bridge rectifier BD2 serve as the third input connection terminal and the fourth input connection terminal of the rectifier and filter circuit 20, respectively; the two input terminal of the bridge rectifier BD2 are coupled to the third rectifier connection terminal and the fourth rectifier connection terminal, respectively. The positive terminal of the bridge rectifier BD1 serves as the positive output terminal of the rectifier and filter circuit 20; the negative terminal of the bridge rectifier BD1 serves as the negative output terminal of the rectifier and filter circuit 20. The positive terminal of the bridge rectifier BD2 is coupled to the positive terminal of the bridge rectifier BD1; the negative terminal of the bridge rectifier BD2 is coupled to the negative terminal of the bridge rectifier BD1. One terminal of the capacitor C1 is coupled to the positive terminal of the bridge rectifier BD1; the other terminal of the capacitor C1 is coupled to the negative terminal of the bridge rectifier BD1.

The DC/DC converter circuit 30 includes a switching transistor Q1, a parallel resistor array RP10, and a transformer T1. The DC/DC converter circuit 30 includes a positive voltage input terminal, a negative voltage input terminal, a driver input terminal, a current feedback terminal, a ground terminal, a positive voltage output terminal, and a negative voltage output terminal. In the present embodiment, the switching transistor Q1 is a metal-oxide-semiconductor field-effect transistor (MOS-FET). The drain of the switching transistor Q1 serves as the positive voltage input terminal of the DC/DC converter circuit 30 and is coupled to the positive output terminal of the rectifier and filter circuit 20. The gate of the switching transistor Q1 serves as the driver terminal of the DC/DC converter circuit 30. The source of the switching transistor Q1 is coupled to one terminal of the parallel resistor array RP10 and the cathode of a diode D9. The other terminal of the parallel resistor array RP10 serves as the ground terminal of the DC/DC converter circuit 30 and is coupled to one terminal of the transformer T1; the other terminal of the transformer T1 is coupled to one terminal of a capacitor EC2. The transformer T1 is provided with a node coupled to the anode of a diode D10.

The output circuit 40 includes a positive connection terminal, a negative connection terminal, a power supply terminal for a chip in a normal working state, a positive output terminal, and a negative output terminal. The output circuit 40 includes an output diode D10, a resistor R7, and a parallel capacitor array CP10 all supplying power for the PWM controller circuit 70; the output circuit 40 further includes a capacitor EC2, a resistor R10, a freewheeling diode D9, and bridge rectifiers BD1, BD2 all supplying power for the LED load circuit 50. The anode of the diode D10 is coupled to the node of the transformer T1, the cathode of the diode D10 is coupled to one terminal of the resistor R7; the other terminal of the resistor R7 serves as the power supply terminal for the chip in the normal working state of the output circuit 40 and is coupled to the PWM controller circuit 70 and one terminal of the parallel capacitor array CP10; the other terminal of the parallel capacitor array CP10 is coupled to the DC/DC converter circuit 30. One terminal of the capacitor EC2 is coupled to the other terminal of the transformer T1; the other terminal of the capacitor EC2 is coupled to the anode of the diode D9. The anode of the diode D9 is coupled to the negative input terminal of the LED load circuit 50; the cathode of the diode D9 is coupled to the source of the switching transistor Q1.

The positive connection terminal of the output circuit 40 is coupled to one terminal of both the capacitor EC2 and the resistor R10; the positive output terminal of the output circuit 40 is coupled to the one terminal of both the capacitor EC2 and the resistor R10; the negative connection terminal of the output circuit 40 is coupled to the other terminal of both the capacitor EC2 and the resistor R10; the negative output terminal of the output circuit 40 is coupled to the other terminal of both the capacitor EC2 and the resistor R10.

The LED load circuit 50 includes a positive input terminal and a negative input terminal. The LED load circuit 50 is used for generating light. The positive input terminal of the LED load circuit 50 is coupled to the positive output terminal of the output circuit 40; the negative input terminal of the LED load circuit 50 is coupled to the negative output terminal of the output circuit 40. The LED load circuit 50 includes LED modules coupled in parallel with the capacitor EC2.

The IC start-up circuit 60 includes a resistor string RS1, a positive input terminal, a chip start power supply terminal, and a ground terminal. One terminal of the resistor string RS1 serves as the positive input terminal of the IC start-up circuit 60 and is coupled to the positive output terminal of the rectifier and filter circuit 20. The other terminal of the resistor string RS1 serves as the chip start power supply terminal of the IC start-up circuit 60 and is coupled to the one terminal of the parallel capacitor array CP10.

In the present embodiment, the resistor string RS1 includes a resistor R1, a resistor R2, and a resistor R3, which are sequentially coupled to provide for a chip start-up operation. The parallel capacitor array CP10 includes capacitors C3, EC1 coupled in parallel to provide a stable voltage for a power supply pin of the chip and to provide high or low frequency filtering. The capacitor EC1 is an electrolytic capacitor. The positive terminal of the capacitor EC1 is coupled to one terminal of the resistor R3; the other terminal of the capacitor EC1 is coupled to the ground terminal of the DC/DC converter circuit 30.

The PWM controller circuit 70 includes a chip U1, capacitors C2, C4, and resistors R8, R9. The PWM controller circuit 70 includes a driver output terminal, a ground terminal, a power supply input terminal, and a feedback input terminal. The chip U1 includes a driver pin, a ground pin, a timing capacitor pin, a power supply pin, a current sense pin, and a compensation pin. The driver pin of the chip U1 is coupled to one terminal of the resistor R8; the other terminal of the resistor R8 serves as the driver output terminal of the PWM controller circuit 70 and is coupled to the driver input terminal of the DC/DC converter circuit 30. The ground pin of the chip U1 serves as the ground terminal of the PWM controller circuit 70 and is coupled to the ground terminal of the DC/DC converter circuit 30. The timing capacitor pin of the chip U1 is coupled to the ground pin through the capacitor C4. The compensation pin of the chip U1 is coupled to the ground pin through the capacitor C2. The power supply pin of the chip U1 serves as the power supply input terminal of the PWM controller circuit 70 and is coupled to the chip start power supply terminal of the IC start-up circuit 60, and the power supply terminal for the chip in the normal working state of the output circuit 40. The current sense pin of the chip U1 serves as the feedback input terminal of the PWM controller circuit 70 and is coupled to the current feedback terminal of the DC/DC converter circuit 30.

In the present disclosure, the buffer capacitors CX1, CX2, and CX3 are configured between the input terminals of the input circuit 10. Since the voltage over a capacitor cannot be suddenly changed, the internal component of the LED driver coupled in series with the ballast in the lamp will not be damaged by high voltage. The bleeder resistor strings RX10, RX20, and RX30 are used to release electrical charge of the buffer capacitors CX1, CX2, and CX3 when the LED driver circuit stops working, such that voltages of the buffer capacitors CX1, CX2, and CX3 decrease, and the harm to a human body can be avoided.

The input circuit 10 can be coupled to the mains electricity via any two of the first electrical energy connection terminal, the second electrical energy connection terminal, the third electrical energy connection terminal, and the fourth electrical energy connection terminal, to form a circuit. In one of the connection manners, the first electrical energy connection terminal of the input circuit 10 is coupled to the line wire or the neutral wire of the mains electricity; one of the second electrical energy connection terminal, the third electrical energy connection terminal, and the fourth electrical energy connection terminal of the input circuit 10 is coupled to the neutral wire or the line wire of the mains electricity accordingly. In another one of the connection manners, the second electrical energy connection terminal of the input circuit 10 is coupled to the line wire or the neutral wire of the mains electricity; one of the first electrical energy connection terminal, the third electrical energy connection terminal, and the fourth electrical energy connection terminal of the input circuit 10 is coupled to the neutral wire or the line wire of the mains electricity accordingly. In still another one of the connection manners, the third electrical energy connection terminal of the input circuit 10 is coupled to the line wire or the neutral wire of the mains electricity; one of the first electrical energy connection terminal, the second electrical energy connection terminal, and the fourth electrical energy connection terminal of the input circuit 10 is coupled to the neutral wire or the line wire of the mains electricity accordingly. In yet another one of the connection manners, the fourth electrical energy connection terminal of the input circuit 10 is coupled to the line wire or the neutral wire of the mains electricity; one of the first electrical energy connection terminal, the second electrical energy connection terminal, and the third electrical energy connection terminal of the input circuit 10 is coupled to the neutral wire or the line wire of the mains electricity accordingly.

The input circuit 10 can be coupled to the ballast via any one of the combinations of the first electrical energy connection terminal, the second electrical energy connection terminal, the third electrical energy connection terminal, and the fourth electrical energy connection terminal, to obtain electrical energy through both terminals of the ballast. In a connection manner which allows to connect to a rapid start ballast, an instant start ballast, a programmed start ballast, or a magnetic ballast, both the first electrical energy connection terminal and the second electrical energy connection terminal are coupled to one terminal of the ballast, both the third electrical energy connection terminal and the fourth electrical energy connection terminal are coupled to the other terminal of the ballast. In a connection manner which allows to connect to an instant start ballast, the first electrical energy connection terminal is coupled to one terminal of the ballast, and the second electrical energy connection terminal is coupled to the other terminal of the ballast. In another connection manner which allows to connect to an instant start ballast, the third electrical energy connection terminal is coupled to one terminal of the ballast, and the fourth electrical energy connection terminal is coupled to the other terminal of the ballast.

After configuring the input circuit 10 in the LED driver circuit, the lamp provided with the LED driver circuit can be compatible with a ballast. Meanwhile, the lamp provided with the LED driver circuit can be directly coupled to the mains electricity.

The rectifier and filter circuit 20 is used for converting alternative current (AC) output by the input circuit 10 to DC by the bridge rectifiers BD1, BD2 thereof. The capacitor C1 is used for reducing fluctuation of output voltage of the bridge rectifiers BD1, BD2. When the switching transistor Q1 of the DC/DC converter circuit 30 is switched on, diodes of the bridge rectifiers BD1, BD2 serving as output rectifier diodes of the output circuit 40 are used for converting DC to supply power to the LED load circuit 50.

When the chip U1 is not working, the parallel capacitor array CP10 is charged by the resistor string RS1. When the voltage across the parallel capacitor array CP10 reaches the value for the chip U1 to start working, voltage of the power supply pin of the chip U1 satisfies the requirement for the chip U1 to work, therefore the chip U1 starts to work. The chip U1 obtains changes in the current through the parallel resistor array RP10 via the voltage value of the current sense pin thereof, and a driver signal for the DC/DC converter circuit 30 is generated by internal calculation of the chip U1.

The driver output terminal of the PWM controller circuit 70 outputs the driver signal which used to control on or off of the switching transistor Q1. When the switching transistor Q1 is switched on, current flows from the drain of the switching transistor Q1 to the source of the switching transistor Q1, and current flowing from the source of the switching transistor Q1 passes through the parallel resistor array RP10 and the transformer T1 sequentially; the current flowing from the other terminal of the transformer T1 charges the capacitor EC2, and when the capacitor EC2 is charged to a turn-on voltage of the LED load circuit 50, the current flows to the positive input terminal of the LED load circuit 50, and through the bridge rectifiers BD1, BD2 to form a rectifier circuit. When the switching transistor Q1 is off, the output terminal of the transformer T1 cannot suddenly change, therefore together with the full charged capacitor EC2 it continues to power the LED load circuit 50, and a discharge circuit is formed by returning to the original input terminal of the transformer T1 through the freewheeling diode D9 and the parallel resistor array RP10. When the switching transistor Q1 is switched on or off, by setting the resistance of the parallel resistor array RP10 and letting current flow through the parallel resistor array RP10, an associated voltage signal will be generated; connect the current sense pin of the chip U1 to one terminal of the parallel resistor array RP10, thus the chip U1 can determine value of the current flowing through the LED load circuit 50 based on value of the voltage generated at the one end of the parallel resistor array RP10, and control the on or off of the switching transistor Q1 by the driver signal so that current flowing through the LED load circuit 50 can be maintained within a proper range.

In the present embodiment, by providing the input circuit 10 in the LED driver circuit, when the LED driver circuit coupled to the ballast is turned on, damage of the LED driver circuit caused by excessive voltage can be avoid, thus the reliability and service life of the LED driver circuit can be ensured, and lamps provided with the LED driver circuit can not only be coupled to the mains electricity by a ballast, but also be directly coupled to the mains electricity.

Although the disclosure is illustrated and described herein with reference to specific embodiments, the disclosure is not intended to be limited to the details shown. Rather, various modifications may be made in the details within the scope and range of equivalents of the claims and without departing from the disclosure. Therefore, the scope of the present disclosure shall be defined by the appended claims.

What is claimed is:

1. A light emitting diode (LED) driver circuit compatible with a ballast, comprising: an input circuit, a rectifier and filter circuit, a direct current/direct current (DC/DC) converter circuit, an output circuit, and an LED load circuit, which being sequentially coupled;
    wherein the input circuit comprises buffer capacitors (CX1), (CX2), and (CX3); bleeder resistor strings (RX1), (RX2), and (RX3); and insurance resistors (F1), (F2), and (F3); the input circuit comprises a plurality of input terminals and a plurality of output terminals; each of the output terminals of the input circuit is coupled to other output terminals of the input circuit through the bleeder resistor strings (RX1), (RX2), and (RX3), and the buffer capacitors (CX1), (CX2), and (CX3) respectively; and each of the buffer capacitors (CX1), (CX2), and (CX3) is coupled parallel to each of the bleeder resistor string (RX1), (RX2), and (RX3), respectively;
    wherein the LED driver circuit further comprises an integrated circuit (IC) start-up circuit coupled to the rectifier and filter circuit, and a pulse width modulation (PWM) controller circuit coupled to the DC/DC converter circuit.

2. The LED driver circuit of claim 1, wherein the input terminals of the input circuit comprise a first electrical energy connection terminal, a second electrical energy connection terminal, a third electrical energy connection terminal, and a fourth electrical energy connection terminal;
    the output terminals of the input circuit comprise a first rectifier connection terminal, a second rectifier connection terminal, a third rectifier connection terminal, and a fourth rectifier connection terminal;
    both terminals of the buffer capacitor (CX1) are coupled to the first rectifier connection terminal and the second rectifier connection terminal, respectively;
    both terminals of the buffer capacitor (CX2) are coupled to the third rectifier connection terminal and the second rectifier connection terminal, respectively;
    both terminals of the buffer capacitor (CX3) are coupled to the third rectifier connection terminal and the fourth rectifier connection terminal, respectively;
    both terminals of the bleeder resistor string (RX1) are coupled to the first rectifier connection terminal and the second rectifier connection terminal, respectively;
    both terminals of the bleeder resistor string (RX2) are coupled to the third rectifier connection terminal and the second rectifier connection terminal, respectively; and
    both terminals of the bleeder resistor string (RX3) are coupled to the third rectifier connection terminal and the fourth rectifier connection terminal, respectively.

3. The LED driver circuit of claim 1, wherein the bleeder resistor string (RX1) comprises bleeder resistors (RX4), (RX5) coupled in series;
    the bleeder resistor string (RX2) comprises bleeder resistors (RX6), (RX7) coupled in series; and
    the bleeder resistor string (RX3) comprises bleeder resistors (RX8), (RX9) coupled in series.

4. The LED driver circuit of claim 1, wherein the rectifier and filter circuit comprises bridge rectifiers (BD1), (BD2), and a capacitor (C1);

one terminal of the capacitor (C1) is coupled to the positive terminal of the bridge rectifier (BD1) and the positive terminal of the bridge rectifier (BD2);

the other terminal of the capacitor (C1) is coupled to the negative terminal of the bridge rectifier (BD1) and the negative terminal of the bridge rectifier (BD2).

5. The LED driver circuit of claim 1, wherein the DC/DC converter circuit comprises a switching transistor (Q1), a parallel resistor array (RP10), and a transformer (T1), which are sequentially coupled; the transformer (T1) is provided with a node.

6. The LED driver circuit of claim 5, wherein the switching transistor (Q1) is a metal-oxide-semiconductor field-effect transistor (MOS-FET);

a source of the switching transistor (Q1) is coupled to one terminal of the parallel resistor array (RP10) and a cathode of a diode (D9);

the other terminal of the parallel resistor array (RP10) is coupled to one terminal of the transformer (T1);

the other terminal of the transformer (T1) is coupled to one terminal of a capacitor (EC2);

the node of the transformer (T1) is coupled to an anode of a diode (D10).

7. The LED driver circuit of claim 5, wherein the LED load circuit comprises a positive input terminal and a negative input terminal;

the output circuit is coupled to the DC/DC converter circuit; the output circuit comprises a diode (D10), a resistor (R7), and a parallel capacitor array (CP10), which are coupled to the PWM controller circuit; the output circuit further comprises a capacitor (EC2), a resistor (R10), a freewheeling diode (D9), and bridge rectifiers (BD1), (BD2), which are coupled to the LED load circuit;

wherein an anode of the diode (D10) is coupled to the node of the transformer (T1), a cathode of the diode (D10) is coupled to one terminal of the resistor (R7); the other terminal of the resistor (R7) is coupled to the PWM controller circuit and one terminal of the parallel capacitor array (CP10); the other terminal of the parallel capacitor array (CP10) is coupled to the DC/DC converter circuit;

one terminal of the capacitor (EC2) is coupled to the DC/DC converter circuit;

the anode of the diode (D9) is coupled to the negative input terminal of the LED load circuit, the cathode of the diode (D9) is coupled to the source of the switching transistor (Q1).

8. The LED driver circuit of claim 1, wherein the LED load circuit comprises LED modules coupled in parallel with the capacitor (EC2).

9. The LED driver circuit of claim 1, wherein the IC start-up circuit comprises a resistor string (RS1); one terminal of the resistor string (RS1) is coupled to the rectifier and filter circuit; the other terminal of the resistor string (RS1) is coupled to one terminal of the parallel capacitor array (CP10) and the PWM controller circuit.

10. The LED driver circuit of claim 1, wherein the PWM controller circuit comprises a chip (U1), capacitors (C2), (C4), and resistors (R8), (R9);

the chip (U1) comprises a driver pin, a ground pin, a timing capacitor pin, a power supply pin, a current sense pin, and a compensation pin; the driver pin of the chip (U1) is coupled to one terminal of the resistor (R8); the other terminal of the resistor (R8) is coupled to the DC/DC converter circuit; the ground pin of the chip (U1) is coupled to the DC/DC converter circuit; the timing capacitor pin of the chip (U1) is coupled to the ground pin through the capacitor (C4); the compensation pin of the chip (U1) is coupled to the ground pin through the capacitor (C2).

* * * * *